INVENTORS:
GEORGE W. GAERTNER, JR.
DAVID E. RAMEY
BY: René D. Gaertner
THEIR ATTORNEY United States Patent Office 3,509,210
Patented Apr. 28, 1970

3,509,210
PREPARATION OF DICHLOROACETYL
CHLORIDE
George W. Gaertner, Jr., and David E. Ramey, Modesto,
Calif., assignors to Shell Oil Company, New York,
N.Y., a corporation of Delaware
Continuation-in-part of application Ser. No. 457,607,
May 21, 1965. This application Oct. 9, 1968, Ser.
No. 772,451
Int. Cl. C07c 53/14; B01j 1/10
U.S. Cl. 260—544          8 Claims

ABSTRACT OF THE DISCLOSURE

Dichloroacetyl chloride is prepared by oxidizing trichloroethylene with an oxygen-containing gas at elevated temperatures in the presence of a free-radical generating means either at superatmospheric pressures or at atmospheric to superatmospheric pressures in the presence of a secondary or tertiary amine.

Figure 1:
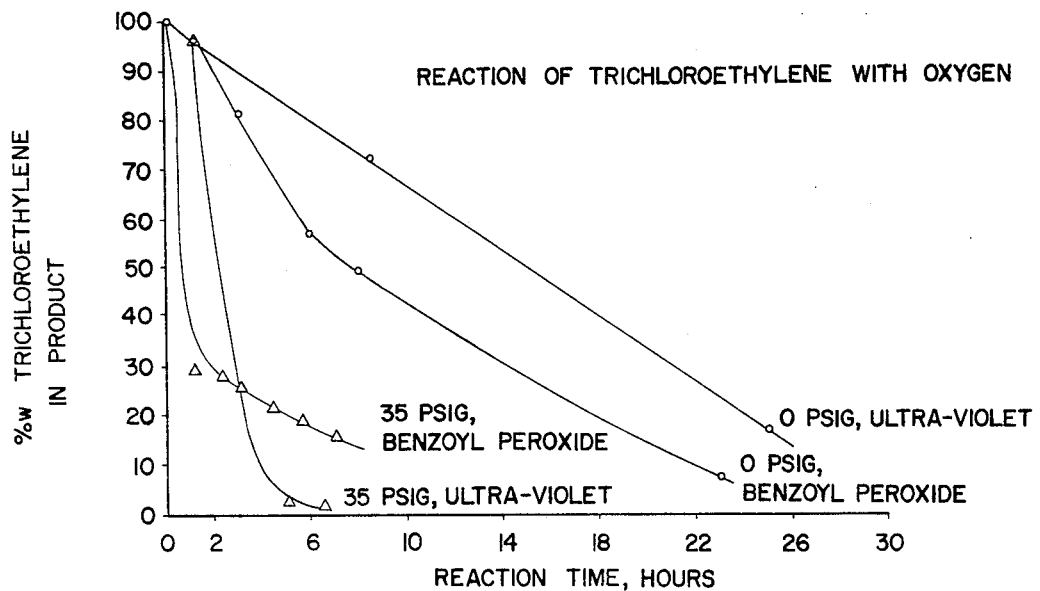

This application is a continuation-in-part of copending application Ser. No. 457,607, filed May 21, 1965. now abandoned.

BACKGROUND OF THE INVENTION

Field of the invention

This invention relates to synthesizing dichloroacetyl chloride by the oxidation of trichloroethylene.

Description of the prior art

Dichloroacetyl chloride is an important reactant in the synthesis of many compounds of commerce. It is a particularly attractive reactant for preparing haloacetophenones which are precursors to many commercial pesticides. Examples of insecticides prepared from haloacetophenones using dichloroacetyl chloride as a starting material are described in U.S. 2,956,073 and U.S. 3,102,842.

However, the use of dichloroacetyl chloride for preparing these insecticides has not been commercially attractive due to the high cost and limited availability of dichloroacetyl chloride.

The oxidation of trichloroethylene to dichloroacetyl chloride is well known in the art. For example, U.S. 1,976,265, U.S. 2,292,129 and L. L. McKinney et al., Ag. and Food Chem. 3, 413 (1955) disclose such processes, but these methods have the disadvantages of long reaction times and a large loss of desired yield to side products.

In particular, the above art processes yield dichloroacetyl chloride and trichloroethylene oxide in near equal amounts, as well as smaller amounts of hexachlorobutylene, phosgene, carbon monoxide, hydrogen chloride, trichloroethylene polymers and other products of undetermined constitution. The presence of trichloroethylene oxide is especially undesirable due to its unstable properties. The formation of these side products in substantial amounts results in a corresponding loss of yield of dichloroacetyl chloride. In addition, the desired product must be separated from these other products by costly fractionation which also results in substantial loss of yield.

Further, U.S. 1,976,265, U.S. 2,292,129 and the McKinney et al. article teach that after the oxidation of the trichloroethylene, the trichloroethylene oxide formed can be converted to dichloroacetyl chloride by the use of secondary and tertiary amines. This art specifically teaches that in the initial oxidation step, the trichloroethylene should be free of secondary and tertiary amines as it is well known that such amines stabilize chlorinated hydrocarbons, such as trichloroethylene, against oxidation.

Also, the two-step process of the art which involves oxidation and then reacting the product with an amine to isomerize the trichloroethylene oxide is commercially undesirable due to the expense of the additional equipment and processing needed for the two steps. Further, the isomerization of the oxide is a highly exothermic reaction which is difficult to properly control.

Accordingly, it would be highly desirable for commercial purposes to decrease the long reaction time of the prior art processes for oxidizing trichloroethylene to dichloroacetyl chloride and at the same time improve the yields. It would be even more desirable to find a one-step process for the oxidation of trichloroethylene to pure dichloroacetyl chloride in high yield in a short reaction time, with only negligible amounts of trichloroethylene oxide, phosgene and other undesirable side products being formed.

SUMMARY OF THE INVENTION

It is an object of this invention to provide an improvement in the oxidation of trichloroethylene to dichloroacetyl chloride. It is a further object of this invention to provide an efficient and economical one-step process for selectively converting trichloroethylene to dichloroacetyl chloride in high yields. Another object of the invention is to provide a process for the selective oxidation of trichloroethylene to dichloroacetyl chloride in high yield using reaction conditions and catalyst which minimize the reaction time and result in a negligible yield of undesired byproducts. Yet another object of the invention is to provide a commercial process for the oxidation of dichloroacetyl chloride in high yield in a manner free from explosion or fire hazards. Further objects of the invention will be apparent to one skilled in the art.

These and other objects are accomplished by selectively oxidizing trichloroethylene with a gas containing oxygen at elevated temperatures in the presence of a free-radical generating means.

One aspect of the invention involves using superatmospheric pressure which greatly reduces the reaction times while still producing high conversions of the trichloroethylene.

Another aspect of the invention involves carrying out the reaction in the presence of a secondary or tertiary amine which results in a one-step process for producing high yields of substantially pure dichloroacetyl chloride with negligible amounts of the undesirable side-products found in the prior art processes. This aspect is indeed surprising in view of the prior art teachings that these amines should not be present during the oxidation reaction. Atmospheric or superatmospheric pressures are suitable in this aspect of the invention.

These and other aspects of the process will become clear in the following discussion of the invention.

DESCRIPTION OF THE PREFERRED EMBODIMENTS

The invention is carried out by reacting trichloroethylene in liquid phase with a gas containing molecular oxygen at elevated temperatures in the presence of the catalysts and under the conditions mentioned above. The gas may be pure oxygen, air, oxygen enriched air, or any inert gas which contains substantial amounts of molecular oxygen.

The gas may be made to contact the liquid by any method known to the art. For example, the gas may be forced under pressure through a fritted glass sparger. The reaction stoichiometry indicates that only 0.12 pound of oxygen is required per pound of trichloroethylene. In order to insure complete oxidation it is advantageous to use an excess over the stoichiometric amounts of oxygen. Quantities of over 100% by weight excess of oxygen over trichloroethylene may be employed without adverse effects upon yield.

However, when using superatmospheric pressures in the reaction of the invention, it is desirable to use air or any other inert gas containing molecular oxygen rather than pure oxygen. The reaction rate is considerably reduced, but the hazards of explosion and fire are also greatly reduced. Also, air is the most economical oxygen-containing gas available. The feed rate of the gas containing oxygen is preferably such that about 0.1 mole of oxygen per hour to 0.6 mole of oxygen per hour per mole of trichloroethylene present is introduced into the reaction.

The selective oxidation of trichloroethylene by the process of the invention is carried out with the aid of a free-radical generating means. Any of the free-radical generators known in the art are suitable. These include the various forms of electromagnetic radiation such as ultra-violet actinic light or chemical free-radical generators.

By ultra-violet light is meant that electromagnetic radiation having a wavelength or wavelengths between about 4000 angstroms and about 400 angstroms. However, in general, this radiation is produced artificially by sources such as the mercury arc lamps, the hydrogen arc lamps and the zirconium arc lamps, which in addition to a mixture of wavelengths of ultraviolet radiation emit light in the visible region, and have a typical spectrum ranging from 3800–7600 A. The intensity of such light in the process of the invention will, of course, depend not only on the composition of the indicated system but also on the nature, configuration and disposition of the light source and of the reaction vessel. However, a minimum intensity of sufficient energy to initiate the process of the invention is, of course, required.

Suitable chemical free-radical generators include the organic peroxides, certain cobaltous salts and the azo compounds.

The suitable organic peroxides (including hydrogen peroxide) may be defined by the formula R—O—O—R wherein R and R' are hydrogen or organic radicals. These include the hydroperoxides, R is hydrogen and R' is alkyl, cycloalkyl, cycloalkenyl, alkaryl, aralkyl and heterocyclic of up to 12 carbon atoms; the dialkyl peroxides, R and R' are each alkyl of up to 12 carbon atoms; the diaralkyl peroxides, R and R' are each aralkyl of up to 20 carbon atoms; the aliphatic peroxy acids, R is hydrogen and R' is alkanoyl or aroyl up to 12 carbon atoms; the peroxy esters of said peroxy acids, R is alkyl or aryl of up to 12 carbon atoms and R' is alkanoyl or aroyl of up to 12 carbon atoms; the diacyl peroxides, R and R' each are alkanoyl of up to 12 carbon atoms; the diaroyl peroxides, R and R' each are aroyl of up to 12 carbon atoms as well as the dialkyl peroxy-dicarbonates, 1-hydroxyalkyl hydroperoxides, bis(1-hydroxyalkyl)peroxides, polyalkylidene peroxides, alkyl 1-hydroalkyl peroxides, peroxy acetals and the like. Examples of these and other suitable peroxides are described in "Organic Peroxides," Interscience Publishers, Inc., New York (1945) by A. V. Tobalsky et al. on pages 157–176.

Preferred organic peroxides are those wherein R and R' are hydrogen, alkyl of 1–4 carbon atoms, aralkyl of up to 12 carbon atoms, alkanoyl of up to 12 carbon atoms or aroyl of up to 12 carbon atoms.

These include such species as the methyl, ethyl, propyl, n-butyl, t-butyl, α-methylbenzyl, α,α-dimethylbenzyl, and α-p-xylyl hydroperoxides; peropyacetic acid, peroxycaproic acid, peroxylauric acid, peroxybenzoic acid, p-ethylperoxybenzoic acid; the dimethyl, diethyl and dibutyl peroxides; di-α-cumyl peroxide, diacetyl peroxide, di-n-butyryl peroxide, dilauroyl peroxide, dibenzoyl perxoide, bis-(3,4-dimethylbenzoyl)peroxide and the like. Dibenzoyl peroxide and t-butyl hydroperoxide have been found to be especially suitable organic peroxides for the process of the invention.

Suitable cobaltous salt initiators are those that are soluble in trichloroethylene and include such species as cobaltous hexamine naphthalene β-sulfonate, cobaltous hexamine picrate and the various cobaltous alkylated-naphthalenesulfonates. Especially preferred from this group are cobaltous methyl naphthalenesulfonate and cobaltous ethyl naphthalenesulfonate.

The azo compounds, which are the preferred initiators of the invention, may be described by the formula

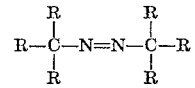

wherein at least one and preferably both carbons attatched to the azo group, —N=N—, are tertiary, and wherein R is a radical chosen from the group of H, —CN,

—R'CONH$_2$ wherein R' is alkylene of up to 6 carbon atoms, carbalkoxy radicals of up to 5 carbon atoms, and alkyl of 1 to 6 carbon atoms.

The more preferred azo catalysts have both valences of the azo group, —N=N—, attached to different tertiary carbons further bonded to at least one of the negative groups —CN, —CONH$_2$, and a carbalkoxy radical of 2 to 7 carbons, with the remaining valences bonded to CH$_3$, as these are the most active azo compounds within the preferred temperature range of the invention of about 60° to 150° C.

Examples of such azo compounds wherein R may be —CN, hydrogen and alkyl are alpha,alpha'-azobisisobutyronitrile,
alpha,alpha'-azobis(alpha-enanthonitrile),
alpha,alpha'-azobis(alpha-methyleneanthonitrile),
alpha,alpha'-azobis(alpha,gamma-dimethylvaleronitrile),
alpha,alpha'-azobis(alpha-ethylbutyronitrile),
azobis(alpha-methylbutyronitrile),
alpha,alpha'-azo-dicyclohexanecarbonitrile, and
alpha,alpha'-azobis-(alpha,alpha'-cyclopropylpropionitrile).

Examples of the azo compounds wherein R may be carbalkoxy of 1 to 7 carbon atoms, hydrogen, and alkyl of 1 to 6 carbon atoms are methyl alpha,alpha'-azodiisobutyrate,
alpha,alpha'-azobis(alpha,gamma-dimethylvalerate),
ethyl alpha,alpha'-azodiisobutyrate and
hexyl alpha,alpha'-azodiisobutyrate.

Examples of azo compounds wherein R may be hydrogen and R'CONH$_2$ wherein R' is up to 5 carbon atoms are alpha,alpha'-azodiisobutyramide, and
alpha,alpha'-azobis(alpha,gamma-dimethyl caproamide).

Due to the relative low cost, commercial availability, and usefulness in the process of the invention, the most preferred azo compound is alpha,alpha'-azobisisobutyronitrile (hereinafter referred to as ABIN).

The initiator is added to the reaction in catalytic amounts as needed. Generally, the range of initiator will be from about 0.001–1.0 percent based on the weight of the trichloroethylene, although the optimum amount is somewhat dependent upon the type of initiator and reaction conditions. For example, the preferred amount for the azo initiators is about 0.01–0.1 percent on the same weight basis.

A satisfactory temperature range for the process of the invention is from about 50° C. to 250° C. The optimum range is, of course, influenced by the type of initiator used and the other reaction variables. For example, the preferred range for the azo initiators is from about 60° C. to about 150° C. while for the other free-radical generators, temperatures of 65° C. to 200° C. are more generally satisfactory with 75° C. to 110° C. being preferred.

When the process of the invention is carried out at elevated temperatures and at superatomspheric pressures in the absence of the secondary of tertiary amines, pressures of from 2 up to 20 atmospheres are suitably employed, preferably, pressures of 3 to 10 atmospheres are employed. The use of these superatmospheric pressures surprisingly results in trichloroethylene being selectively oxidized in high yields in relative short reaction times to dichloroacetyl chloride. This is a decided improvement over the long reaction times and relatively low yields of dichloroacetyl chloride produced by the prior art methods.

In the preferred aspect of the invention wherein an amine is present during the oxidation, atmospheric or superatmospheric pressure may be employed. Suitable pressures range from 1 to 100 atmospheres with pressures of 2 to 20 atmospheres being preferred. Especially preferred are pressures of 3 to 12 atmospheres.

The secondary and tertiary amines used in the preferred aspect of this invenion are alkyl amines and cyclic amines of up to 12 carbon atoms such as:

dimethylamine,
diethylamine,
dihexylamine,
pyridine,
picoline,
piperidine, and the like.

Also useful in the invention are tertiary aryl amines of up to 14 carbon atoms such as N,N-dimethylaniline,
N,N-dipropylaniline,
N-methyl-N-ethylaniline,
N,N-dibutylaniline, and the like.

The present invention preferably utilizes tertiary alkyl amines of up to 18 carbon atoms, especially up to 12 carbon atoms, such as trimethylamine,
triethylamine,
tributylamine,
trihexylamine,
tri-n-propylamine, and the like.

Further examples of such amines will be obvious to those skilled in the art.

The amine may be added to the reaction in quantities of between about 30 parts per million to 1000 parts per million by weight based on the reaction mixture present. The preferred concentration of amine is between about 80 to 150 parts per million, with about 100 parts per million being especially preferred. As triethylamine is inexpensive and easy to obtain, it is the preferred amine of the invention.

The particular advantage of using superatmospheric pressures can best be appreciated by reference to the accompanying drawings which shows two graphs comparing the rates of conversion of trichloroethylene to dichloroacetyl chloride under atmospheric conditions and at 35 p.s.i.g.

Figure 2:
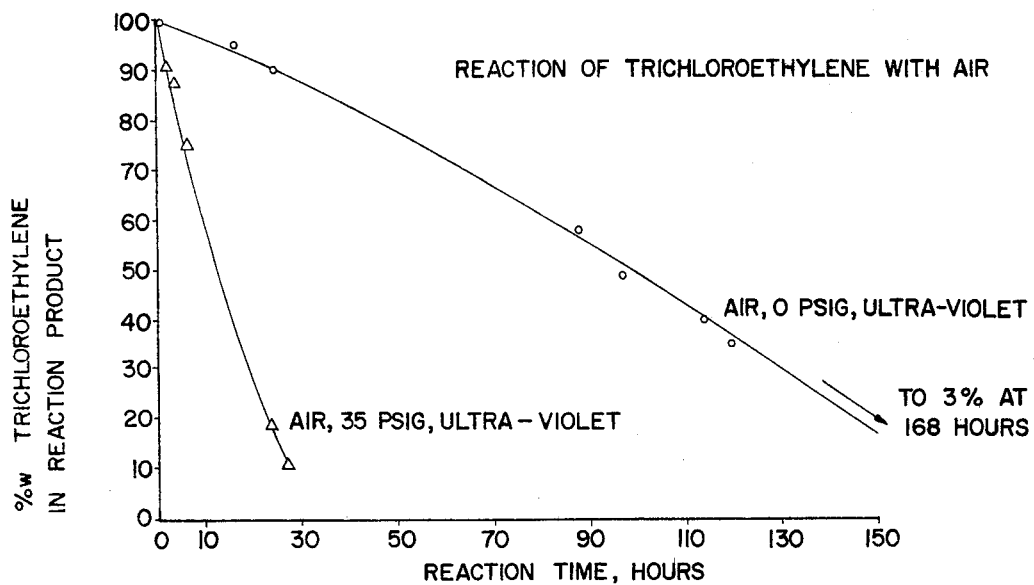

FIGURE 1 compares the reaction rates of the conversion of trichloroethylene with oxygen without pressure and at 35 p.s.i.g., while FIGURE 2 compares the conversion with air at 0 p.s.i.g. and at 35 p.s.i.g. It is apparent from the results presented graphically in FIGURES 1 and 2 that the conversion of trichloroethylene at a pressure of 35 p.s.i.g. proceeds at a markedly more rapid rate when either air or oxygen is used as the oxidizing agent than at atmospheric pressure under the same conditions. This is the case when either ultra-violet light or benzoyl peroxide is used as the free-radical initiator. The accelerated rate of the reaction at the higher pressure shows a marked reduction in time required for the oxidation of trichloroethylene. It is readily apparent by reference to FIGURE 1 that the 90 percent conversion at 35 p.s.i.g. takes approximately 30 hours while the 90 percent conversion at atmospheric pressure required approximately 160 hours.

Thus when either air or oxygen is employed, the oxidation of trichloroethylene under the conditions of the process of the invention proceeds at approximately one sixth the time of the reaction rates taught by the prior art.

It is this marked and unexpected increase in the reaction rate which provides a practical process for the economic production of dichloroacetyl chloride. The expensive fractionation to eliminate the undesired by-products is no longer necessary. The shortening of the reaction time has resulted in a selective process which gives dichloroacetyl chloride in high yield and high purity.

Aside from considerations of yield of dichloroacetyl chloride, the process of the invention suppresses the oxidative pathway which gives rise to the highly toxic undesirable products, carbon monoxide, hydrogen chloride and phosgene and suppresses formation of trichloroethylene polymers.

As mentioned above, the art specifically teaches that the oxidation of trichloroethylene to dichloroacetyl chloride should be carried out in a reaction environment free of tertiary amines. This is due to the fact that these amines are known to stabilize chlorinated hydrocarbons and, consequently, will decrease the oxidation rate to the point that such a process would not be commercially feasible. However, the reactions of the art produce equal amounts of dichloroacetyl chloride and the undesirable side-product trichloroethylene oxide, and smaller amounts of chloral, phosgene, and other equally unwanted products. The presence of these unwanted side products in such substantial amounts greatly decreases the yield of the desired product. Also, further yield is lost in the second step isomerization of the trichloroethylene oxide. For example, the best reported conversions of trichloroethylene was 60% with a 70% yield of dichloroacetyl chloride with reaction times of 6 or more hours.

As a result of the teachings of the art that secondary and tertiary amines should not be present in the oxidation of trichlorethylene, it is indeed surprising and unexpected that the combination of the invention compirsing a free-radial generating means, a secondary or tertiary amine and elevated temperatures in the oxidation of dichloroacetyl chloride would result in substantially pure dichloroacetyl chloride with negligible amounts of the undesirable side-products found in the art processes.

Accordingly, it has been found that this aspect of the invention results in 50 to 80 percent conversion of the trichloroethylene to dichloroacetyl chloride with only 1 to 3 percent production of unwanted liquid side products in approximately one to two hours of reaction time. This result is quite important commercially due to the very short reaction time.

This aspect of the invention is especially important commercially due to the fact that the trichloroethylene can be easily distilled from the reaction mixture since the mixture is substantially free of undesirable side products. Consequently, the dichloroacetyl chloride left behind may be purified by simple distillation or other simple purification techniques known to the art. The unreacted trichloroethylene may then be recycled through the process of the invention and further converted to dichloroacetyl chloride. The most attractive commercial aspect of the invention is the fact that 90% yields of pure dichloroacetyl chloride with near 100% conversion of trichloroethylene can be obtained by recycling the unreacted trichloroethylene through the process of the invention. On each recycle, more trichloroethylene may be added to the reaction, thus resulting in a continuous process.

Further, the process of the invention may be run in a batch reaction technique wherein the trichloroethylene is allowed to react approximately three hours and then the unreacted trichloroethylene may be easily distilled from the reaction mixture and the dichloroacetyl chloride mixture may be purified as described above. Here again, near 100% conversion of trichloroethylene can be obtained with about 90% yield of dichloroacetyl chloride.

Contamination of the process of the invention with iron or copper should be avoided. It has been found that when any of the reactor surfaces or lines which carry the reactants contain metallic iron or copper, a significant quantity of chloral appeared as one of the reaction products, and in addition, such contaminants slow the reaction rate. The use of conducting lines and reaction vessels constructed of or lined with other metals such as nickel has obviated this problem. Also, non-metallic lined conducting lines or reaction vessels such as those which are made of or lined with glass or ceramic are also suitable.

To illustrate the novel selective oxidation process of the invention, the following examples are set forth. It should be understood that these examples are given for purpose of illustration of the process and should not be regarded limiting the scope of the claims. In the following examples the proportions are expressed in parts by weight unless otherwise noted.

EXAMPLE I

A glass pressure reaction vessel was charged with 200 parts of acid-washed distilled trichloroethylene. A metal mesh sleeve was placed over the lower portion of the vessel and a coil of copper tubing was wound tightly about the top portion for cooling water. The vessel was irradiated with an ultra-violet lamp and heated by use of an infrared heat lamp. Temperature of the latter was thermostatically controlled to give the desired reaction temperature of 75° C. Oxygen from a cylinder was admitted at 40 p.s.i.g. with the back pressure regulator set at 35 p.s.i.g. The oxygen flow was calibrated at approximately 0.3 mole per hour. Oxygen was bubbled through a fritted glass sparger placed in contact with the trichloroethylene.

The reaction was stopped at the end of 6 hours. Analysis of samples of the 200 parts of the reaction product formed indicated that 88% of the trichloroethylene had been converted. The yield of dichloroacetyl chloride amounted to 45% m., and trichloroethylene oxide to 43% m. as determined by infrared analysis. The oxide is readily convertible to dichloroacetyl chloride.

Using a procedure similar to that outlined in Example I several other runs were conducted comparing the use of pressures, oxygen source, and initiator. These results are summarized in Table I.

TABLE I.—OXIDATION RUN SUMMARY

| Feed | Pressure | Initiator | Temperature, ° C. | Reaction time, hrs. | Trichloroethylene conversion percent [1] |
|---|---|---|---|---|---|
| O₂ | Atmospheric | UV | 75 | 25 | 82 |
| O₂ | 35 p.s.i.g | UV | 75 | 6.5 | 99 |
| O₂ | 35 p.s.i.g | UV | 100 | 5.3 | 97 |
| O₂ | Atmospheric | Benzoyl peroxide | 75 | 23 | 93 |
| O₂ | 35 p.s.i.g | do | 75 | 7 | 86 |
| Air | Atmospheric | UV | 75 | 168 | 97 |
| Air | 35 p.s.i.g | UV | 75 | 27 | 89 |
| Air | 50 p.s.i.g | Benzoyl peroxide | 100 | 21.5 | 91.5 |
| Air | 50 p.s.i.g | t-Butyl-hydroperoxide | 100 | 21.5 | 91 |
| Air | Atmospheric | Benzoyl peroxide | 65–80 | 72 | 5 |

[1] As represented by yield of dichloroacetyl chloride and trichloroethylene oxide.

EXAMPLE II

The operation of the process of the invention on a scaled up procedure is illustrated in the following example. 1900 gallons of trichloroethylene were charged into a glass-lined reaction vessel. Triethylamine was added to give a concentration of 100 p.p.m. Compressed air at 104° C. and 50 p.s.i.g. was introduced into the trichloroethylene. The temperature was maintained at 104–105° C. by semi-continuous feed of the 70% t-butyl-hydroperoxide catalyst solution and intermittent steam to the oxidizing vessel jacket.

Oxidation was continued for approximately 85 hours until GLC analysis of the reactor sample indicated that over 99 percent of the reaction mixture was dichloroacetyl chloride.

EXAMPLE III

By the procedures of Example I, 200 parts of trichloroethylene were oxidized with air (0.32 c.f.h.) at 50 p.s.i.g. and 100° C. using t-butylhydroperoxide as the initiator and 100 p.p.m. of triethylamine for 23 hours to a conversion of 80%. No trichloroethylene oxide or chloral was present in the crude dichloroacetyl chloride.

EXAMPLE IV

The following Table II sets forth the summary of batch trichloroethylene oxidation experiments carried out in the presence and absence of triethylamine at atmospheric pressures. The selectivity of the oxidation was established in terms of the ratio of trichloroethylene oxide (TCEE) to dichloroacetyl chloride (DCAC) found in the reaction product.

The reactions were carried out in a ¾″ glass tube with reactants consisting of 60 millilters of trichloroethylene, oxygen introduced at the rate of 0.32 mole/hour after being dried over a 5 angstrom molecular sieve and under reaction conditions of 80° C. and 1 atmosphere pressure. The initiator used was alpha,alpha′-azobisisobutyronitrile.

TABLE II

| Initiator, p.p.m. | TCE [1] half-life, t½ hr. | Selectivity, TCEE/DCAC | Triethylamine, p.p.m. |
|---|---|---|---|
| 1,000 | 2.6 | 1.30 | 0 |
| 1,000 | 2.7 | 1.06 | 0 |
| 1,000 | 3.1 | 0.02 | 100 |
| 100 | 5.9 | 1.34 | 0 |
| 100 | 7.4 | 1.24 | 0 |

[1] Reaction time for ½ of trichloroethylene to be oxidized.

The results demonstrate the greatly increased selectivity obtained by the use of triethylamine at atmospheric pressure. They also show that the half-life of the reaction was not appreciably extended by the presence of the triethylamine.

EXAMPLE V

Table III sets out comparison of the effect of varying amounts of the ABIN initiator and the triethylamine catalyst as carried out in the process of the invention. The experiments were carried out in a continuous reaction cycle method in a 2.3-gallon reactor and elevated temperatures and pressures. The production rate of the continuous reaction is given in grams/hr., meaning that so many grams per hour were removed from the reaction vessel and replaced with an equivalent amount of trichloroethylene. The product was analyzed by a gas liquid chromatograph (GLC) with the results also set forth in Table III.

The product after the first hour of operation was analyzed by a gas liquid chromatograph. The result of this analysis is set forth in Table III. As is evident from Table III, only 3 to 6% unwanted side products were produced, with about 49% to 68% dichloroacetyl chloride being produced, with the remaining percent being trichloroethylene which can be recycled through the reaction vessel.

TABLE III.—OXIDATION OF TRICHLOROETHYLENE TO DICHLOROACETYL CHLORIDE (CONTINUOUS PROCESS)

| Temp., °C. | | Pressure, p.s.i.g. | Air feed s.c.f.h.[1] | ABIN[3] initiator, p.p.m. | Triethyl-amine, p.p.m. | Production rate, gms./hr. | GLC analysis of crude liquid product[2] | | | | |
|---|---|---|---|---|---|---|---|---|---|---|---|
| Top | Bottom | | | | | | Phosgene | Other side products | TCE[4] | TCEE[5] | DCAC[6] |
| 127 | 119 | 125 | 107 | 422 | 92 | 12,532 | 1.11 | 1.58 | 47.29 | 0.92 | 49.10 |
| 125 | 120 | 125 | 107 | 988 | 82 | 8,331 | 1.36 | 1.50 | 43.18 | 0.61 | 53.33 |
| 125 | 122 | 125 | 107 | 500 | 50 | 11,000 | 1.32 | 3.57 | 40.90 | 0.53 | 53.68 |
| 125 | 122 | 125 | 60 | 1,359 | 136 | 3,963 | 1.53 | 2.71 | 27.46 | 0.86 | 67.43 |
| 125 | 122 | 125 | 60 | 1,133 | 113 | 4,986 | 1.54 | 2.34 | 27.59 | 0.63 | 67.85 |
| 125 | 122 | 125 | 107 | 500 | 50 | 11,000 | 1.44 | 1.46 | 37.69 | 1.73 | 57.68 |

[1] Standard cubic/feet/hour.
[2] Percent weight heavy ends free basis. The heavy ends in the above reactions did not exceed more than 2% of the total product.
[3] Alpha,alpha'-azobisisobutyronitrile.
[4] Trichloroethylene.
[5] Trichloroethylene oxide.
[6] Dichloroacetyl chloride.

EXAMPLE VI

When trichloroethylene is oxidized in the presence of molecular oxygen to dichloroacetyl chloride according to the physical procedure outlined in Example IV in the presence of a catalytic amount such as 100 p.p.m. alpha,alpha'-azobis(alpha-enanthonitrile) and a catalytic amount of dihexylamine, under the conditions of temperatures about 100° C. to 140° C. and pressures between about 2 to 10 atmospheres, the unreacted trichloroethylene may be distilled from the reaction mixture after about two hours of reaction time. The remaining reaction mixture consists of mainly dichloroacetyl chloride which may be further purified by distillation or other purification steps known to the art.

The comparatively pure trichloroethylene distilled off from the reaction mixture may then be recycled through the reaction process again in a continuous process. More trichloroethylene may be added on recycle to replace that oxidized to dichloroacetyl chloride. Yields of up to 90% dichloroacetyl chloride and near 100% conversion of trichloroethylene may be obtained by this method.

EXAMPLE VII

When trichloroethylene is oxidized to dichloroacetyl chloride in the presence of molecular oxygen in a batch process in the presence of about 1000 p.p.m. of alpha,alpha'-azobis(alpha,gamma-dimethyl valeramide) and about 500 p.p.m. of tri-n-propylamine under the conditions of temperature of about 140° C. and pressure of about 15 atmospheres, pure dichloroacetyl chloride may be distilled off after a reaction time of about 3 to 4 hours. Yields of about 90% dichloroacetyl chloride may be obtained with near 100% conversion of trichloroethylene.

EXAMPLE VIII

When trichloroethylene is oxidized in the presence of molecular oxygen in the presence of about 250 p.p.m. of methyl alpha,alpha'-azodiisobutyrate and about 300 p.p.m. of piperidine under the conditions of temperature about 150° C. and pressure of about 3 atmospheres, pure dichloroacetyl chloride may be distilled off the reaction product in about two hours of reaction time. Yields of about 90% dichloroacetyl chloride with near 100% conversion of trichloroethylene may be obtained by recycling the unreacted trichloroethylene through the reaction vessel.

We claim as our invention:

1. The process of synthesizing dichloroacetyl chloride comprising oxidizing trichloroethylene in a reaction mixture consisting essentially of trichloroethylene, an oxygen-containing gas, a free-radical generating means selected from the group consisting of ultraviolet light, peroxide compounds, azo compounds and colbaltous salts and from about 30 parts per million to 1000 parts per million by weight of the reaction mixture of a secondary amine

wherein each R is alkyl of 1 to 6 carbon atoms, a tertiary aryl amine

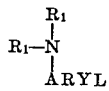

wherein each $R_1$ is alkyl of 1 to 4 carbon atoms, and the total number of carbon atoms of $R_1$ and ARYL hydrocarbons together does not exceed 14 carbon atoms, or a tertiary alkyl amine of the structure

wherein each $R_2$ is alkyl of 1 to 6 carbon atoms, at a temperature of from about 50° C. to about 250° C. and at a pressure of between about 1 to 100 atmospheres.

2. The process of claim 1 wherein the free-radical generating means is an azo compound of the formula

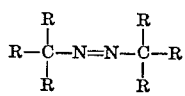

wherein at least one of the carbons attached to the acyclic azo group is tertiary, and wherein R is hydrogen,
—CN,
—R'OCNH$_2$ wherein R' is alkylene of up to six carbon atoms, carbalkoxy of up to 5 carbon atoms, or alkyl of 1 to 6 carbon atoms.

3. The process of claim 2 wherein the temperature is from 60° C. to 150° C. and the pressure is 2 to 20 atmospheres.

4. The process of claim 3 wherein R is —CN, hydrogen or alkyl of 1–6 carbon atoms.

5. The process of claim 4 wherein the azo compound is alpha, alpha'-azobisisobutyronitrile.

6. The process of claim 5 wherein the amine is a tertiary alkyl amine

wherein each R is alkyl of 1 to 4 carbon atoms.

7. The process of claim 6 wherein the amine is triethylamine.

8. The process of synthesizing dichloroacetyl chloride comprising oxidizing trichloroethylene in a reaction mixture consisting essentially of trichloroethylene, an oxygen-containing gas, and a free radical generating means selected from the group consisting of ultraviolet light and peroxide compounds, at a temperature of from about 50° to about 250° C. and at a pressure of from 2 to about 20 atmospheres.

References Cited

UNITED STATES PATENTS

| | | | |
|---|---|---|---|
| 1,976,265 | 10/1934 | Mugdan | 260—123 |
| 2,292,129 | 8/1942 | Kirkbride | 204—163 |
| 2,321,823 | 6/1943 | Kirkbride | 204—163 |
| 2,472,946 | 6/1949 | Hart | 260—544 |

LORRAINE A. WEINBERGER, Primary Examiner

E. J. GLEIMAN, Assistant Examiner

U.S. Cl. X.R.

204—158